UNITED STATES PATENT OFFICE.

JENS LASSEN LA COUR, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE PRODUCTION OF REACTIONS IN GASES IN CLOSED SYSTEMS.

1,290,584.

Specification of Letters Patent.

Patented Jan. 7, 1919.

No Drawing. Application filed November 17, 1915. Serial No. 62,002.

*To all whom it may concern:*

Be it known that I, JENS LASSEN LA COUR, subject of the King of Sweden, residing at Christiania, Norway, have invented certain new and useful Improvements in Processes for the Production of Reactions in Gases in Closed Systems; and I do hereby declare the following to be a full, clear, and exact description of the invention, such as will enable others skilled in the art to which it appertains to make and use the same.

This invention relates to the production of reactions in gases and has for its object a process by means of which the composition of the gas passing through the reaction compartment is maintained practically constant.

In the production of reaction in gases, where the oxygen of air acts as an oxidant such for instance as is the case in furnaces for the combustion of nitrogen it is of advantage that the gas contained in the furnace is richer in oxygen than the air of the atmosphere. When oxygen is added to obtain this, the gases must be maintained circulating in a closed system between the furnaces and the apparatus in which the reaction products are separated off. This closed system is supplied with the quantities of gas, which in the furnace enters into chemical combinations and thus disappear, because the reaction products are removed from the system.

A difficulty connected with such processes consists in the drawbacks caused by the leaky condition of the plant. For various reasons it is suitable to work under a low pressure in greater parts of the system, and then difficulties are connected with discovering the leakages.

These conditions have been a hindrance to the practical use of the process.

According to the present invention the demand for a really tight furnace is waived, the process being carried out as if an unintentional entrance of air is an unavoidable feature of the process causing a slowly occurring change in the composition of the gas mixture. If by this introduction of air there is not supplied a greater quantity of oxygen than what is gradually consumed it will be sufficient for the purpose of maintaining a constant relation between oxygen and nitrogen to supply oxygen only. The composition of the circulating gas will also in this case however be altered for the reason that undesired components of the air such as for instance argon will gradually accumulate in the gas, so that a renewal of the circulating quantity of gas will be necessary. Usually a larger quantity of air will be sucked into the system than what corresponds to the quantity of nitrogen consumed in the process, and if the relative proportions of oxygen and nitrogen is still maintained constant by the supply of air, the volume of the circulating gas will increase and changes take place in the conditions of pressure in the system. These disadvantages are avoided according to the present invention by continually or at suitable intervals removing such quantities of the circulating gas that the volume of this latter is maintained constant and so that the quantities of undesirable components do not exceed a certain limit. The gas which is removed from the system contains more oxygen than the air and is therefore with economical advantages employed instead of ordinary air for the production of the oxygen required for enriching the circulating gas. For this purpose the withdrawn quantity of gas is treated to remove from the same the injurious constituents and also the greater quantity of nitrogen, whereupon the almost pure oxygen is again introduced into the system.

The treatment of the withdrawn gas to obtain oxygen may be done in any well known manner, for example, by converting the gas into liquid condition and obtaining the oxygen by fractional distillation.

The advantages obtained in this manner may be clearly understood from the following example:

In a furnace for the fixation of air nitrogen only about 2.5% of the whole quantity of air circulating will react in each cycle. If now 5% of atmospheric air enters the system through leakages the system will be supplied with $5 \times 0.79 = 3.95\%$ of nitrogen and with $5 \times 0.21 = 1.05\%$ of oxygen in each cycle. Of the gas mixture there is consumed for each 5 molecules of oxygen 2 molecules of nitrogen owing to the well known fact that when the gas is absorbed in water, nitric acid is formed according to the following equation:

$$2N + 5O + H_2O = 2HNO_3.$$

Provided that 2.5% of the gas mixture reacts

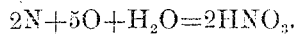
$$2.5 \times \frac{N_2}{N_2O_5} = 2.5 \times \frac{28}{108} = 2.5 \times 0.26 = 0.65\%$$

of nitrogen and $2.5 + 0.65 = 1.85\%$ of oxygen is consumed.

Thus $3.95 + 0.65 = 3.30\%$ of nitrogen has to be removed, but owing to the fact that this nitrogen when a mixture for instance of 50% is treated, is mixed with the same quantity of oxygen, about 3.30 of this latter will be removed at the same time.

According to the above 1.85% of oxygen is used in each cycle and at the same time 3.30% is withdrawn by the removal of gas mixture. Therefore the system must be supplied with $1.85 + 3.30 = 5.15\%$ of oxygen that is about $$\frac{5.15}{1.85} = 2.8$$

times as much oxygen as would have been the case if the system had been absolutely tight.

The costs of the production of oxygen depend to a large extent upon the oxygen contents of the air or gas mixture employed. It will pay to utilize the 3.30% of oxygen which is taken out of the system together with the said 3.30% of nitrogen. By such a process the large advantage is obtained that the oxygen plant necessary for an untight furnace system is not very much larger than the oxygen plant necessary for a completely tight system. When a circulation system working under pressure is employed then by and by the impurities contained in the entering gases will accumulate and effect a dilution of the reacting gases, whereby the output will decrease. Further such impurities will effect a reduction of the output owing to injurious chemical reactions taking place.

According to the present invention to prevent this a quantity of air may be forced into the system from the outside of the same (said quantity of air corresponding to the quantity of air entering the system through the leakages of the same) so that a suitable quantity of gas may be removed from the system, which gas after having been freed from the injurious gases and the larger proportion of its nitrogen is again introduced into the circulation system under pressure. When the gases rich in oxygen which are removed from the system contain chemical compounds injurious to the process and which might have been produced during the process the said gases must of course be purified before they are introduced into the oxygen plant.

I claim.

1. A process for the production of reactions in gases in a closed system, in which the gases circulate comprising the steps of introducing air into the system and withdrawing from the system a portion of the circulating gas mixture from which the reaction products have been partly or wholly removed, utilizing the said portion of the gas mixture for the production of oxygen and introducing the oxygen so produced into the system.

2. Process for the production of reactions in gases in a closed system in which the gases circulate, comprising the steps of introducing air into the system and withdrawing from the system a portion of the circulating gas mixture from which the reaction products have been partly or wholly removed, subjecting the said portion of the gas mixture to a purification process and utilizing the resulting gas for the production of oxygen and introducing the oxygen so produced into the system.

3. The process of producing oxids of nitrogen from atmospheric air, wherein a volume of gas containing oxygen and nitrogen is repeatedly caused to pass an electric arc in a closed circuit, comprising maintaining an excess of oxygen in the circulating gases by withdrawing from the circuit during circulation therein quantities of gas mixture, removing oxygen from the gas mixture taken from the circuit and returning said oxygen into the circuit.

4. The process of producing oxids of nitrogen from atmospheric air wherein a volume of gas containing oxygen and nitrogen is repeatedly caused to pass an electric arc in a continuous circuit having leakage thereto, which comprises removing quantities of gas from the circuit sufficient to maintain the volume of gases in said circuit substantially constant, separating oxygen from the gases so removed and returning the oxygen into the circuit.

5. The process of producing oxids of nitrogen from atmospheric air wherein a volume of gas containing oxygen and nitrogen is repeatedly caused to pass an electric arc in circuit, comprising maintaining a leakage of air into the circuit and an oxygen content greater than is required for the reaction, and removing from the circuit, during the
5 circulation of the gases, gas mixture rich in oxygen, and returning oxygen from the said removed gas mixture into the circuit.

In testimony that I claim the foregoing as my invention, I have signed my name in presence of two subscribing witnesses.

JENS LASSEN LA COUR.

Witnesses:
M. E. GUTTORUKUN,
C. FABRICIUS HANSEN.